United States Patent [19]

Pierce et al.

[11] Patent Number: 4,704,415

[45] Date of Patent: Nov. 3, 1987

[54] HIGH EFFICIENCY SUPERPLASTICIZER COMPRISING A SULFONATED COPOLYMER OF STYRENE AND ALPHA-MESTYRENE FOR CEMENT COMPOSITIONS

[75] Inventors: Richard A. Pierce; Tipton T. Masterson, both of Lake Jackson, Tex.

[73] Assignee: The Dow Chemical Company, Midland, Mich.

[21] Appl. No.: 873,900

[22] Filed: Jun. 13, 1986

[51] Int. Cl.$^4$ ............................ C04B 7/02; C04B 7/35; C08G 75/24
[52] U.S. Cl. ........................................ 524/8; 523/219
[58] Field of Search ............................ 524/8; 523/219

[56] References Cited

U.S. PATENT DOCUMENTS

| | | | |
|---|---|---|---|
| 2,640,820 | 6/1953 | Teot et al. | 260/79.3 |
| 4,071,493 | 1/1978 | Begou | 260/42.13 |
| 4,076,699 | 2/1978 | Grimaud et al. | 260/79.5 |
| 4,164,426 | 8/1979 | Sinka et al. | 106/90 |

FOREIGN PATENT DOCUMENTS

| | | | |
|---|---|---|---|
| 1162951 | 2/1984 | Canada | 524/8 |
| 1588130 | 4/1981 | United Kingdom . | |

OTHER PUBLICATIONS

Derwent Abs, 8b-132000/21, Ohsmann, DE 3440931, May 15, 1986.

*Primary Examiner*—Herbert J. Lilling
*Attorney, Agent, or Firm*—A. Cooper Ancona

[57] ABSTRACT

Sulfonated copolymers of styrene alpha-methylstyrene are added to cement compositions to improve the workability and strength characteristics of the concrete, mortar or grout product derived therefrom.

27 Claims, No Drawings

HIGH EFFICIENCY SUPERPLASTICIZER COMPRISING A SULFONATED COPOLYMER OF STYRENE AND ALPHA-MESTYRENE FOR CEMENT COMPOSITIONS

BACKGROUND OF THE INVENTION

Several classes of hydraulic cements are known such as Portland cement, high-alumina cement, and gypsum which are categorized by their chemical composition and use. For example, Portland cement is commonly used in structural applications and is high in silicate content. In this disclosure the term "cement" shall refer to silicate cement compositions including Portland cement, pozzolanic cements, hydraulic limes, fly ash and natural cements. Cements are used in concrete, grouting and mortar compositions which contain other components such as sand and gravel, or stone.

Cement compositions are rendered useful by the combination of the solid components with water. To obtain a mixture with sufficient workability in order to pour into a mold or form, an amount of water in excess of that required for hydration of the cement components is necessary. During the hardening of the composition, the excess water remains and ultimately, as it evaporates, causes cavities to be formed in the hardened molded structure. These cavities reduce the integrity of the structure and result in a compressive strength which is lower than that theoretically obtainable. It is, therefore, desirable to use the lowest amount of water possible in a cement composition in order to obtain the best compressive strength. Since low amounts of water, while desired for strength, make workability difficult, a compromise is called for.

Additives which cause the strengthening of cement compositions by water reduction while allowing the mixtures to have adequate workability are commonly called water reducers or plasticizers. Those which allow high levels of water reduction are known as high range water reducers or superplasticizers. Application of such materials in cement compositions that have normal levels of water result in mixes with increased fluidity or workability. Lignin sulfonates and sugars are common plasticizers while typical commercial superplasticizers are sulfonated melamine-formaldehyde condensates or sulfonated naphthalene-formaldehyde condensates. In addition, sulfonates of styrene polymers have been described as fluidizing agents for cement compositions.

U.S. Pat. No. 4,164,426 teaches the use of zinc naphthalene-formaldehyde sulfonate in concrete mixes for improved compressive strength. The patented material claimed functions as a superplasticizer but with the added advantage of producing higher strength than normally obtainable, e.g. with the sodium salt of naphthalene-formaldehyde sulfonate.

U.S. Pat. No. 4,071,493 describes alkali metal salts of sulfonated styrene-indene hydrocarbon resins as fluidizing agents for mineral binders.

British Patent No. 1,588,130 describes a hydraulic cement composition which includes a plasticizer comprising a sulfonated polystyrene. It is taught that the sulfonate is preferably used in the salt form. The inclusion of a water soluble carbonate in the composition apparently improves the plasticizing effect of the sulfonated polystyrene although the sulfonated polystyrene may be used with or without the carbonate.

U.S. Pat. No. 4,076,699 describes a process for the preparation and use of alkali salts of a sulfonated styrene polymer or copolymer as fluidizing agents for mineral binders.

The materials exemplified in the patent are the sodium and potassium salts of sulfonated polystyrene and the sodium salt of sulfonated polyvinyltoluene. While it is taught that any styrene or substituted styrene monomer may be copolymerized to yield the fluidizing products of the invention, no examples of such copolymers are given.

SUMMARY OF THE INVENTION

The present invention is an improved cement superplasticizer which is a sulfonated copolymer of styrene and alpha-methylstyrene or a salt thereof. The salt may be derived from an alkali metal, ammonia, an alkaline earth metal or an amine. These salts may also be employed as mixtures with each other. These sulfonated copolymers and salts additionally provide improvements in strength characteristics of the hydraulic cement composition to which it is added.

DETAILED DESCRIPTION OF THE INVENTION

The present invention is a cement superplasticizer which is capable of providing a high degree of fluidity in cement compositions even when it is used at low dosages. This superplasticizer is capable of providing this added workability even when the water to cement ratio of the mix is very low. Thus it will allow excellent workability while providing for increased compressive strength in cement compositions which have the same setting characteristics of the cement composition without the additive.

The superplasticizers of this invention are sulfonated styrene/alpha-methylstyrene copolymers. The sulfonated copolymers may be added as the free sulfonic acid, an alkali, alkaline earth, ammonium, or an amine salt of the sulfonic acid, or mixtures thereof. The sulfonated copolymers of this invention offer an advantage over the known superplasticizers previously described by virtue of being easily prepared while also having an unexpected property of being several times more active in improving the workability of cement compositions.

The superplasticizers of the instant invention may be prepared by a process consisting of three basic steps although some of these steps may be combined in practice. In general, the three steps include polymerization of the monomers, preparation of the sulfonic acid of the copolymer, and neutralization of the acid.

Styrene and alpha-methylstyrene may be copolymerized by any convenient method known to the art for carrying out this reaction. A variety of polymerization initiators may be used including free radical initiators, e.g. peroxide and azo, as well as anionic compounds, such as metal alkyls e.g. n-butyl lithium. It is preferable that the resulting polymer be of low molecular weight, e.g. 2,000 to 20,000 although higher molecular weight materials of up to 100,000-molecular weight will work. Molecular weight as employed in the present disclosure refers to the weight average molecular weight (Mw). The ratio of styrene to alpha-methylstyrene in the products useful in the invention may vary broadly from 90:10 to 10:90. The preferred ratio is 30:70 to 70:30 and a most preferred ratio is 60:40 to 40:60.

Methods of polymerizing styrene and copolymerizing styrene with other monomers are well known to the art. Representative useful methods can be found in Encyclopedia of Polymer Science and Technology, Interscience (1965), Vol. 13, pp. 156-200.

The copolymer, if prepared in a solvent compatible with the sulfonation reaction, may be sulfonated as is without further work-up. Preferably, however, the polymer should be isolated and all unreacted monomer removed from it prior to sulfonation. The temperature for the sulfonation reaction may vary from $-10°$ C. to about 35° C. and preferably 0° to 10° C. The sulfonation step may be carried out in various solvents which are compatible with sulfur trioxide although it is conveniently carried out in a chlorinated solvent such as methylene chloride or ethylene dichloride under anhydrous conditions using sulfur trioxide as the sulfonating agent. The degree of sulfonation (moles of sulfur trioxide per mole of phenyl functionality in the polymer) of the polymer has a great effect on the resulting activity of the product. The degree of sulfonation may vary from 0.5 to 2.0 for obtaining an acceptable product. The preferred range sulfonation for best activity in the product is 1.0 to 1.5. The resulting sulfonic acid precipitates from the chlorinated solvent and is easily removed by filtration and isolated after removal of residual solvent. Alternatively the sulfonic acid may be removed from the reaction mixture by dissolution in water and subsequent separation of the organic and aqueous phases.

Subsequently, the sulfonated polymer can be neutralized to form a salt. If it had been previously isolated the resulting sulfonic acid can be dissolved in water and then the aqueous solution may be neutralized with a solution of an alkali metal, alkaline earth metal, ammonia, or an amine.

The above described steps may be carried out individually as described or as a combined continuous process. For example, a solution of the polymer in a chlorinated solvent may be sulfonated by combining it in a convenient mixing chamber with a stream of sulfur trioxide dissolved in a like chlorinated solvent. From this point, the resulting slurry is passed into another mixing chamber where water or an appropriate basic solution is introduced and the sulfonic acid is taken up and/or neutralized in the aqueous phase. The two phases are then separated to yield the product solution directly.

The sulfonated copolymer, its alkali or alkaline earth metal salts, ammonium, or amine salts or mixtures thereof can be introduced into a cement slurry as a solid or in aqueous solution. They may be added with the water used in the preparation of the cement composition or they may be added at a later stage in the process of preparing the particular cement composition. They are employed in the cement slurry at levels of from about 0.05% to about 2.0% based on the dry weight of cement. A preferred range is from about 0.1% to about 0.5%. Within these ranges, however, the amount is highly dependent on the application for which the superplasticizer is intended. For example, in the production of high strength concretes the water to cement ratio is usually 0.3 to 0.4. Specifically, in the placement of a high strength slab, more workability would be required than for the pouring of a high strength structural beam in a mold. Since the pouring of the high strength slab would require good workability, more of the superplasticizer of this invention would have to be added than in the case of the structural beam where very little working of the cement mixture is required.

Another factor governing the amount of the superplasticizer is the time required for a certain workability. In the above case, a slab which has a large surface will require a longer period of time for working than for a structural beam which when in the mold has only a small surface exposed. The concrete for the slab will need to have a better and longer lasting workability than that for the structural beam and therefore a larger amount of the superplasticizer would be required. As another example, if a highly workable concrete of average strength was required, e.g., for an application where large amounts of reinforcing steel make placement difficult, then a different amount of the superplasticizer might be required to obtain the desired high workability necessary for adequate placement of the concrete in the highly reinforced form.

The superplasticizer of the invention may be employed in the concrete mixture alone or in combination with other additives, e.g. antifoaming, set retarding and set accelerating agents. It is well known that the inclusion of air in concrete mixes is helpful in producing a product with good strength and durability. It is commonly recommended that the entrained air levels be from 3.0 to 7.0%. In some cases, especially when employing a sulfonate of the copolymer in this invention, entrained air levels may reach higher levels than the recommended maximum of 7.0%. Therefore, an antifoam agent may be advantageously employed for the control of entrained air in the resulting cement composition. Any antifoam agent which will produce the desired results in a cement composition may be employed. Typically polysiloxanes and polyglycols work well.

Antifoam agents are typically employed in amounts within the range of from about 50 to about 200 ppm. based on the weight of the cement. A preferred range is about 75 to 150 ppm.

PREPARATION OF THE POLYMERS

Polystyrene - Example A (comparative)

Into a 100 ml flask was placed 50 g of uninhibited styrene and 1.5 g of benzoyl peroxide. This mixture was heated to about 50° C. until a thick mass of polymer filled the reaction flask. Excess styrene was then removed by rotary evaporation and the polymer was isolated as a brittle solid with Mw=70550. Mw is the weight average molecular weight as determined by GPC.

COPOLYMERS OF STYRENE - ALPHA-METHYLSTYRENE

Example 1

Into a 250 ml flask was added 50 g of uninhibited styrene, 150 g of uninhibited alpha-methylstyrene, and 6.0 g of benzoyl peroxide. This mixture was heated to reflux until a thick mass of polymer filled the reaction flask. Excess monomer was removed by distillation and then rotary evaporation. The polymer was isolated as a brittle solid with Mw of 14754. The ratio of styrene to alpha-methylstyrene was 40:60.

Example 2

To a 500 ml three neck flask fitted with a condensor, nitrogen inlet, and ⅛ inch tubing inlet was added 125 g toluene, 12.5 g each of styrene and alpha-methylstyrene, and 2.5 g of Vazo 88 (tradename for an azo-type initiator sold by DuPont). This mixture was heated at reflux for one hour, then a solution of 250 g of toluene, 112.5 g each of styrene and alpha-methylstyrene, and 10 g of Vazo 88 was added over a period of four hours. The mixture was heated overnight then cooled. The polymer was isolated by rotary evaporation of the solvent and further drying of the solid material in a vacuum over. The isolated material had Mw of 6200 and a styrene to alpha-methylstyrene ratio of 60:40.

Example 3

In the apparatus described in Example 2 above was placed 600 g of ethylene dichloride, 100 g each of styrene and alpha-methylstyrene, and 20 g of Lupersol 531–80B (tradename for a peroxide initiator sold by Lucidol). This mixture was stirred at reflux for two hours, then a solution of 1400 g of ethylene dichloride, 900 g each of styrene and alpha-methylstyrene, and 40 g of Lupersol 531–80B was added over a period of seven hours. The mixture was heated at reflux for 18 hours, then 20 g of Lupersol 531–80B in 100 g of ethylene dichloride was added over a period of three hours. Following this, the mixture was stirred at reflux for four more hours. At this point, most of the ethylene dichloride was removed from the mixture and the remaining viscous solution was poured into methanol. The polymer was then isolated as a white precipitate with Mw of 12750 and a styrene to alpha-methylstyrene ratio of 60:40.

Example 4

The copolymer was prepared in a manner similar to Example 3 above. The isolated product had Mw of 10973 and a styrene to alpha-methylstyrene ratio of 60:40

Example 5

A copolymer was prepared by a continuous process using an anionic initiator. The product had Mw of 8500 and a styrene to alpha-methylstyrene ratio of 40:60.

SULFONATION OF THE POLYMERS

The following procedure was based on that described in U.S. Pat. No. 2,640,820. A 5% solution of the polymer in methylene chloride was cooled to about 0° C. and added to a chilled 1000 ml resin kettle which contained a Waring blender blade. The blender was turned on and a 5% solution of sulfur trioxide in methylene chloride at about 0° C. was added at the rate of 120 ml per minute. A fine precipitate was formed immediately and the mixture was digested for one minute after the addition was complete. The precipitate was then collected on a fritted glass filter, washed with methylene chloride and dried. An aqueous solution of the product was prepared and then neutralized (if the salt was desired) with the appropriate base. The degree of sulfonation for each of the polymers in Examples A and 1–5 are given in Table I. In this table and the following description, comparative examples are designated by letters and the examples of the invention are numbered.

TABLE I

| Polymer of Example | Degree of Sulfonation* |
|---|---|
| A (comparative) | 1.0 |
| 1 | 1.0 |
| 2 | 1.3 |
| 3 | 1.2 |
| 4 | 1.2 |

TABLE I-continued

| Polymer of Example | Degree of Sulfonation* |
|---|---|
| 5 | 1.2 |

*Degree of sulfonation is the ratio of moles of sulfur trioxide to moles of phenyl group in the polymer.

PREPARATION OF CONCRETE COMPOSITIONS AND SCREENING TEST PROCEDURE

All concrete test batches were mixed in Hobart model N-50 five quart stainless steel mixer. The penetration tests were conducted with a modified Vicat cone penetrometer, Humboldt model H-3133. Plastic cups from the Carthage Cup Comapny (12 ounce) were used as the test containers. All materials were weighed on a Mettler P11N top-loading balance to plus or minus 0.1 g Sand was obtained in bulk from Vernor Materials Company. All the sand was passed through a number 4 (0.187 inch opening) screen before being dried in a Lee 10 ft$^3$ coniform-type dryer. The dried sand was then stored in plastic-lined fiber drums prior to use. The cement used for these tests was Trinity Type I Portland cement or TXI Type I Portland cement that was kept in a dry air-tight container after the sack was opened. Deionized water was used in all cases.

The following mixing procedure was based on ASTM C305–82 and C192–81. A 1200 g quantity of cement was weighed out and placed in the mixing bowl. To this was added 2620 or 2800 g of sand and the mixture was dry blended at low speed for 30 seconds. Then, the mixer was turned on low speed and the water was added at a steady rate over a period of about 30 seconds. Enough water was added so that the total (including the water in the polymer test sample) was 480 g. The water/cement ratio (w/c) was 0.4. The mixing was continued for a total time of 2 minutes. The mixture was then allowed to stand for 1 minute. During the first portion of this interval, the mortar was scraped from the sides and bottom of the bowl with a rubber spatula. Then the mixer was turned on low speed and the superplasticizer solution was added. Mixing was continued for 2 minutes measured from the time the water was added.

The Vicat penetration test was based on ASTM C780–80 with the exception that the 12oz. plastic cups were used. Samples were tested at 10 minute intervals. The results were plotted as Vicat penetration in millimeters versus time in minutes. In the examples cited, the Vicat penetration reported is that obtained at the 10 minute time interval. The Vicat penetration is a measure of workability of the mortar mix. The larger the Vicat penetration, the higher the workability of the mortar. The scale of penetrations ranges from 0 to 100 mm. In addition, each sample cup was weighed and the density was calculated from the average weight of the samples in each run.

Commercial superplasticizers used for comparative examples include the following:

| | |
|---|---|
| PSI-SUPER, the Gifford-Hill Company | Example B |
| Mighty 150, ICI Americas | Example C |
| Pozzolith 400N, Master Builders | Example D |
| Daracem 100, W. R. Grace | Example E |

\*\*Versa-TL77, National Starch and Chemical Corp.

\*The products of comparative Examples B, C, D and E are formulations of a condensed naphthalene sulfonate.
\*\*This product is the sodium salt of a sulfonated polystyrene.

EXAMPLE 6

These Vicat tests were run as described above with mixes containing 1200 g of Trinity Type I Portland cement, 2620 g of sand, 480 g of water (w/c=0.4), and 0.12 g of an anti-foam agent. (This was a polypropylene glycol of 5000 molecular weight sold under the tradename Voranol 4702 by the Dow Chemical Company.) The sulfonates of Examples A and 1 (Table I) were each neutralized with 50% sodium hydroxide. Concentration of the superplastizer is based on weight of dry cement. Results are shown in Table II.

TABLE II

| Super-plasticizer | Concentration % | Vicat Penetration at 10 Min. (mm) |
|---|---|---|
| CONTROL | — | 32.0 |
| Versa-TL77 | 1.00 | 72.5 |
| Ex. A (sulfonate) | 0.50 | 52.5 |
| Ex. 1 (sulfonate) | 0.25 | 79.0 |

Table II shows a distinct advantage of the superplasticizer of the invention over that of the commercial product or the prepared polystyrene sulfonate (Example A). The superplasticizer of the invention is better than the commercial product at ¼ its concentration and better than Example A at ½ its concentration.

Example 7

The following Vicat tests were performed as described above for mixes with various water to cement ratios. All mixes contained 1200 g of Trinity Type I Portland cement and 2800 g of sand. the superplasticizer used in this example was the sulfonate of the copolmer of example 4 (Table I) which had be neutralized with 50% sodium hydroxide. The concentration of superplasticizer is based on the dry weight of cement. Results are shown in Table III.

TABLE III

| % Polymer (Ex. 4) | Vicat Penetration at 10 Minutes (mm) (w/c Ratios) | | | |
|---|---|---|---|---|
| | 0.35 | 0.40 | 0.45 | 0.50 |
| None | 18.0 | 28.0 | 45.0 | 74.5 |
| 0.10 | 16.5 | 35.0 | 72.5 | — |
| 0.25 | 40.5 | 72.5 | 93.5 | 100+ |
| 0.30 | 43.5 | 80.0 | 100+ | — |
| 0.40 | 49.0 | 84.5 | 100+ | — |
| 0.70 | 55.5 | | | |

The above example shows that the superplasticizer of the invention has the ability to disperse or fluidize cements even when the water level in the cement mix is very low. The data also shows that very high workability cements or "flowing cements" can be produced when the right combination of water and superplasticizer is used.

Example 8

The following Vicat test were performed as described above with mixes containing 1200 g of Trinity Type I Portland cement, 2620 g of sand, and 480 g of water. The superplasticizer in the case was the sulfonated copolymer of Example 1 (having a degree of sulfonation of 1.0) which had been neutralized with 50% sodium hydroxide. The test was performed both with and without an antifoam agent. The antifoam agent employed was Voranol 4702. The concentration has the same basis as before. Results are shown in Table IV.

TABLE IV

| Super-plasti-cizer | Concen-tration (%) | Anti-foam (g) | Vicat Pene-tration at 10 min. (mm) | Density (g/ml) |
|---|---|---|---|---|
| Example 1 | 0.25 | — | 79.0 | 1.98 |
| Example 1 | 0.25 | 0.12 | 82.5 | 2.25 |

The above example shows that an antifoam agent can be used with the superplasticizers of the invention to alter the density without changing the workability of the cement.

Example 9

The following Vicat tests were performed as described above with mixes containing 1200 g of TXI Type I Portland cement, 2800 g of sand, and 480 g of water. The superplasticizer employed, which was the product of Example 4 (Table I) was neutralized with 50% sodium hydroxide. Comparative Examples B and C are commercial superplasticizers. Both are sulfonated naphthalene-formaldehyde condensates. Results are shown in Table V.

TABLE V

| Superplasticizer | Concentration (%) | Vicat Penetration at 10 Min. (mm) |
|---|---|---|
| Example 4 (Table I) | 0.25 | 70.0 |
| Example B, (Comp.) | 0.25 | 27.0 |
| Example C, (Comp.) | 0.25 | 34.5 |

The above example clearly shows that the superplasticizer of Example 4 is several times more active than the commercial products.

Example 10

The following Vicat tests were performed as described above using 1200 g of Trinity Type I Portland cement, 2800 g of sand, and 480 g water (w/c=0.4). Various levels of the superplasticizers were used. The superplasticizers tested were the sulfonated polymers of Examples 2 and 5 (Table I), both neutralized with 50% sodium hydroxide. Each was mixed with 0.18 g of the anti-foam agent of Example 6 prior to use. Three different concentrations of copolymer were used. The results are shown in Table VI.

TABLE VI

| Superplasticizer | Concentration (%) | Vicat Penetration at 10 Minutes (mm) |
|---|---|---|
| CONTROL | | 25.5 |
| Ex. 2 (sulfonate) | 0.15 | 36.5 |
| " | 0.25 | 58.5 |
| " | 0.35 | 56.0 |
| Ex. 5 (sulfonate) | 0.15 | 41.5 |
| " | 0.25 | 47.0 |
| " | 0.35 | 63.5 |

The above example clearly illustrates the fact that the polymer precursor for the sulfonated styrene/alpha-methylstyrene superplasticizers may be prepared by either a free radical or anionic initiated route. Workabilities are similar for both preparations.

Example 11

These Vicat tests were performed as described above with 1200 g of TXI Type I Portland cement, 2800 g of sand, 480 g of water (w/c=0.4) and 0.18 g of the antifoam agent of Example 6. The compressive strengths were obtained on the 2×2×2 in. mortar cubes according to ASTM C 109-80 at 16 hours, 3 days, and 7 days. The superplasticizer was the copolymer of Example 2 (Table 1) which was neutralized with 50% sodium hydroxide. Vicat penetration at 10 minutes was 65 mm plus or minus 5 mm for each sample. Results are shown in Table VII.

TABLE VII

| Superplas- | Conc. | Compressive Strength (psi) at: | | |
|---|---|---|---|---|
| ticizer | (%) | 16 hrs. | 72 hrs. | 168 hrs. |
| CONTROL | — | 1590 | 3810 | 4830 |
| Ex. C (comp.) | 0.35 | 2810 | 5950 | 6140 |
| Ex. B (comp.) | 0.30 | 2873 | 5158 | 5590 |
| Ex. 2 (sulfonate) | 0.25 | 2872 | 5472 | 6100 |

The above example shows that although the superplasticizer of the invention was used in lower amounts than the commercial superplasticizers, it gave equal workability and compressive strength. It can also be seen that the use of the superplasticizers of the present invention gave a remarkable improvement in the workability and strength over the control with the same water to cement ratio.

Example 12

The following concrete tests were obtained when the sodium salt of the sulfonated copolymer of Example 3 (Table I) was tested against two commercial superplasticizers, Examples D and E. The mixes used contained 200 pounds each of stone and sand, 75 pounds of Type I Portland cement, and 30 pounds of water. The stone, sand, and cement were added to the mixer and blended in the dry state. Then water was added and the mix was blended to a smooth consistency. Finally, the superplasticizer to be tested, together with a silicone based antifoam agent (Antifoam B, sold by Dow-corning Corporation), was added and the batch was mixed until 10 minutes had elapsed after the initial addition of water. At this point, the slump was measured and the mixer was turned on for another 10 minutes. At the end of this mixing period, samples were taken for compressive strength testing. Results are shown in Table VIII.

TABLE VIII

| Superplas- | Conc. | Slump | Compressive Strength (psi) | | |
|---|---|---|---|---|---|
| ticizer | (%) | (in.) | 1 day | 7 days | 14 days |
| Ex. D (comp.) | 0.56 | 9.00 | 3871 | 6162 | 6662 |
| Ex. E (comp.) | 0.67 | 9.25 | 3201 | 6039 | 6582 |
| Ex. 3 (sulfonate) | 0.34 | 8.50 | 3159 | 5658 | 6605 |

This data shows that in these concrete mixes, the superplasticizer of this invention performed equally as well as two commercially available materials in terms of workability and strength when added at a much lower level.

Example 13

The following Vicat tests were performed as described above with each mix containing 1200 g of Trinity Type I Portland cement, 2800 g of sand, and 480 g of water. All of the superplasticizers tested were based on Example 4 (Table I) but neutralized with various bases. The first sample shown (H+) was in the acid form. All were added at 0.25% based on the weight of cement. Results are shown in Table IX.

TABLE X

| Salt | Vicat Penetration at 10 Minutes (mm) | Density (g/ml) |
|---|---|---|
| H+ | 64.0 | 1.98 |
| lithium | 64.5 | 1.97 |
| potassium | 64.5 | 1.97 |
| magnesium | 48.5 | 2.07 |
| calcium | 56.5 | 2.04 |
| sodium | 66.5 | 2.03 |
| aminoethylpiperazine | 56.5 | 2.02 |
| diethylenetriamine | 64.0 | 2.06 |
| n-butylamine | 62.0 | 1.93 |
| ethylenediamine | 64.5 | 2.00 |
| ammonia | 59.5 | 2.03 |
| diethylamine | 71.5 | 1.92 |
| triethylamine | 80.0 | 1.94 |
| tetraethylenepentaamine | 71.0 | 1.89 |

This example illustrates that various salts may be employed in order to neutralize the styrene/alpha-methylstyrene sulfonic acid. In addition, it points out that neutralization of the acid is not necessary for good performance of the sulfonate as a superplasticizer. While all of the salts give similar performance, there is some variation in terms of workability and air entrainment (density). It is to be understood that certain advantages in performance may be obtained by using different salts or combinations of these salts.

We claim:

1. In a cement composition comprising cement and a superplasticizer the improvement which comprises employing as the superplasticizer, a sulfonated copolymer of styrene and alpha-methylstyrene wherein the molar ratio of styrene to alpha-methylstyrene is from about 30:70 to about 70:30 and wherein the copolymer is present in an amount of from about 0.05 to 2.0 percent based on the weight of cement.

2. The composition of claim 1 wherein the weight average molecular weight is from about 2,000 to about 100,000.

3. The composition of claim 2 wherein the degree of sulfonation is from about 0.5 to about 2.0.

4. The composition of claim 3 wherein the weight average molecular weight is from about 5,000 to about 20,000.

5. The composition of claim 4 wherein the degree of sulfonation is from about 1.0 to about 1.5.

6. The composition of claim 5 wherein the sulfonated copolymer is in the acid form.

7. The composition of claim 5 wherein the sulfonated polymer is in the form of a salt.

8. The composition of claim 7 wherein the salt is an alkali metal salt or an ammonium salt.

9. The composition of claim 8 wherein the alkali metal is lithium, sodium or potassium.

10. The composition of claim 7 wherein the salt is an alkaline earth metal salt.

11. The composition of claim 10 wherein the alkaline earth metal is magnesium or calcium.

12. The composition of claim 7 wherein the salt is an amine salt.

13. The composition of claim 12 wherein the amine salt is drived from aminoethylpiperazine, diethylamine, triethylamine, n-butylamine, ethylenediamine, diethylenetriamine, triethylenetetramine or tetraethylenepentamine.

14. The composition of claim 1 wherein the sulfonated copolymer is present in a concentration of from about 0.05 to about 2.0 percent by weight based on the weight of the cement.

15. The composition of claim 14 which includes an anti-foam agent.

16. The composition of claim 15 wherein the anti-foam agent is present in an amount of from about 50 to about 200 ppm based on the weight of cement.

17. The composition of claim 5 wherein the copolymer is present in an amount of from about 0.1 to 0.5 percent based on the weight of cement.

18. The composition of claim 17 wherein the composition inculdes an anti-foam agent.

19. The composition of claim 18 wherein the anti-foam agent is present in an amount of from about 50 to about 200 ppm. based on the weight of cement.

20. A process for improving the workability of a cement composition comprising cement and a superplasticizer by adding a sulfonated copolymer of styrene and alph-methylstyrene or a salt thereof as the superplasticizer and wherein the copolymer has a molar ratio of styrene to alpha-methylstyrene of from about 30:70 to about 70:30 respectively, and wherein the copolymer is present in an amount of from about 0.05 to about 2.0 percent based on the weight of cement.

21. The process of claim 20 wherein the sulfonated copolymer has a weight average molecular weight of from about 5,000 to about 20,000.

22. A method of making a cement structure comprising (1) mixing sand, cement, water, and from about 0.05% to about 2.0% of a superplasticizer which is a sulfonated copolymer of styrene and alpha-methylstyrene, a salt thereof or a mixture of said sulfonated copolymer and said salt and wherein said copolymer has a molar ratio of styrene to alpha-methylstyrene of from about 30:70 to about 70:30, whereby the superplasticizer imparts fluidity to said mixture; (2) forming the fluidized mixture into a shape; and (3) curing the said mixture.

23. The method of claim 22 wherein, prior to forming, an anti-foam agent is added to said mixture.

24. The method of claim 23 wherein the antifoam is present in an amount of from about 50 to about 200 ppm. based on the weight of cement.

25. The method of claim 22 wherein the cement is a Portland cement.

26. The method of claim 22 wherein the cement is a mixture of cements.

27. The method of claim 26 wherein the mixture of cements includes fly ash.

* * * * *